(12) United States Patent
Motomiya et al.

(10) Patent No.: US 10,807,534 B2
(45) Date of Patent: Oct. 20, 2020

(54) ELECTRIC RETRACTABLE VIEW DEVICE FOR VEHICLE

(71) Applicant: MURAKAMI CORPORATION, Shizuoka (JP)

(72) Inventors: Masahiro Motomiya, Fujieda (JP); Kenji Ichikawa, Shizuoka (JP); Takayuki Miyazaki, Fujieda (JP); Mizuki Toyama, Kakegawa (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 16/210,557

(22) Filed: Dec. 5, 2018

(65) Prior Publication Data

US 2019/0118716 A1    Apr. 25, 2019

Related U.S. Application Data

(63) Continuation of application No. 15/560,686, filed as application No. PCT/JP2016/058716 on Mar. 18, 2016.

(30) Foreign Application Priority Data

Mar. 31, 2015    (JP) .................................. 2015-071152

(51) Int. Cl.
*B60R 1/074*    (2006.01)
*F16H 55/06*    (2006.01)
(Continued)

(52) U.S. Cl.
CPC .............. *B60R 1/074* (2013.01); *B60R 1/072* (2013.01); *B60R 1/076* (2013.01); *F16H 55/06* (2013.01);
(Continued)

(58) Field of Classification Search
CPC ......... B60R 1/074; B60R 1/076; B60R 1/072; F16H 55/24; F16H 55/06; F16H 1/16;
(Continued)

(56) References Cited

U.S. PATENT DOCUMENTS 6,322,221 B1    11/2001  van de Loo
6,871,969 B2     3/2005  Yamauchi et al.
(Continued)

FOREIGN PATENT DOCUMENTS

CN         1938178         3/2007
EP          166378         1/1986
(Continued)

OTHER PUBLICATIONS

International Search Report for International Patent Application No. PCT/JP2016/058716, dated May 24, 2016, along with an English-language translation thereof.
(Continued)

*Primary Examiner* — Stephone B Allen
*Assistant Examiner* — Rahman Abdur
(74) *Attorney, Agent, or Firm* — Greenblum & Bernstein, P.L.C.

(57) ABSTRACT

Crest-valley repeated shapes that are fitted to each other by a biasing force of a spring are disposed so as to be opposed to each other in opposed surfaces that are opposed to each other and rotate relative to each other between a view device base side and a view device rotating section side. Respective height maintaining protrusions are disposed so as to be opposed to each other in the opposed surfaces. Upon the view device rotating section being rotated from an extended position toward a forward-tilted position by an external force, respective top surfaces of the height maintaining protrusions are brought into abutment with and slide on each other in a position in which abutment between respective top
(Continued)

surfaces of the crests of the crest-valley repeated shapes is cancelled, to maintain a height of the view device rotating section.

15 Claims, 8 Drawing Sheets

(51) Int. Cl.
*B60R 1/072* (2006.01)
*B60R 1/076* (2006.01)
*F16H 55/24* (2006.01)
*F16D 43/202* (2006.01)
*F16D 41/07* (2006.01)
*F16H 1/16* (2006.01)
*H02K 7/116* (2006.01)

(52) U.S. Cl.
CPC ............ *F16H 55/24* (2013.01); *F16D 41/07* (2013.01); *F16D 43/202* (2013.01); *F16H 1/16* (2013.01); *H02K 7/1166* (2013.01)

(58) Field of Classification Search
CPC ..... H02K 7/1166; F16D 41/07; F16D 43/202; F16D 7/044
USPC ........................................................ 359/877
See application file for complete search history.

(56) References Cited

U.S. PATENT DOCUMENTS

| 7,374,299 | B2 | 5/2008 | Brouwer et al. |
| 7,857,278 | B2 | 12/2010 | Yoshida et al. |
| 8,567,972 | B2 | 10/2013 | Sumi et al. |
| 2003/0011907 | A1 | 1/2003 | Yamauchi et al. |
| 2007/0035862 | A1 | 2/2007 | Brouwer et al. |
| 2008/0149803 | A1 | 6/2008 | Yoshida et al. |
| 2009/0040639 | A1 | 2/2009 | Onuki |
| 2012/0134035 | A1 | 5/2012 | Sakata |
| 2012/0134037 | A1 | 5/2012 | Sumi et al. |
| 2013/0010379 | A1* | 1/2013 | Sakata .................... B60R 1/074 359/841 |

FOREIGN PATENT DOCUMENTS

| JP | 61-012452 | 1/1986 |
| JP | 01-237235 | 9/1989 |
| JP | 01-152847 | 10/1989 |
| JP | 08-164796 | 6/1996 |
| JP | 11-078696 | 3/1999 |
| JP | 2001-287593 | 10/2001 |
| JP | 2002-036955 | 2/2002 |
| JP | 2003-025916 | 1/2003 |
| JP | 2004-243799 | 9/2004 |
| JP | 2007-83839 A | 4/2007 |
| JP | 2007-160948 A | 6/2007 |
| JP | 2008-155804 | 7/2008 |
| JP | 2008-296721 | 12/2008 |
| JP | 2011-236973 | 11/2011 |
| JP | 2012-111444 | 6/2012 |
| JP | 2012-116322 | 6/2012 |
| JP | 2014-176283 | 9/2014 |
| JP | 2014-231333 | 12/2014 |
| JP | 3197994 U | 5/2015 |

OTHER PUBLICATIONS

Written Opinion for International Patent Application No. PCT/JP2016/058716, dated May 24, 2016, along with an English-language translation thereof.
Office Action issued in Japanese Counterpart Patent Appl. No. 2015-071152, dated Dec. 4, 2018, along with an English translation thereof.
Japanese Office Action for JP App. No. 2015-071152 dated Jul. 10, 2018, along with English-language translation thereof.

* cited by examiner

ELECTRIC RETRACTABLE VIEW DEVICE FOR VEHICLE

This is a continuation application of U.S. application Ser. No. 15/560,686, filed Sep. 22, 2017, which is a National Stage of International Application No. PCT/JP2016/058716, filed Mar. 18, 2016, which claims the benefit of JP2015-071152 filed on Mar. 31, 2015. The entire disclosure of each of the above-identified applications, including the specification, drawings, claims and abstract, is incorporated herein by reference in its entirety.

TECHNICAL FIELD

This application relates to an electric retractable view device for a vehicle such as an electric retractable mirror for a vehicle or an electric retractable camera for a vehicle, the electric retractable view device enabling a view device rotating section moved from an extended position to a forward-tilted position by an external force to be electrically returned from the forward-tilted position to the extended position.

BACKGROUND ART

In an electric retractable mirror for a vehicle, a mirror rotating section is movable alternatively to a retracted position and an extended position upon being electrically driven and rotated. Also, the mirror rotating section is movable from the retracted position to a forward-tilted position through the extended position and vice versa upon being rotated by an external force.

SUMMARY

Non-limiting embodiments of the present application provide an electric retractable view device for a vehicle, the electric retractable view device enabling a view device rotating section moved from an extended position to a forward-tilted position by an external force to be electrically returned from the forward-tilted position to the extended position.

Solution to Problem

Non-limiting embodiments of the present application provide an electric retractable view device for a vehicle, the view device including crest-valley repeated shapes disposed so as to be opposed to each other in opposed surfaces that are opposed to each other and rotate relative to each other between a view device base side and a view device rotating section side, the crest-valley repeated shapes being fitted to each other by a biasing force of a spring, the view device being configured to enable the view device rotating section to be moved between a retracted position and an extended position upon the view device rotating section being electrically driven, wherein respective height maintaining protrusions are disposed so as to be opposed to each other in the opposed surfaces, and when the view device rotating section is rotated toward a forward-tilted position by an external force, respective top surfaces of the height maintaining protrusions are in abutment with and slide on each other in a position in which abutment between top surfaces of respective crests of the crest-valley repeated shapes is cancelled, to maintain a height of the view device rotating section relative to a shaft. Accordingly, the height of the view device rotating section relative to the shaft is maintained in the forward-tilted position, enabling the view device rotating section to be electrically returned from the forward-tilted position to the extended position.

DESCRIPTION OF EMBODIMENT

Figure 1:
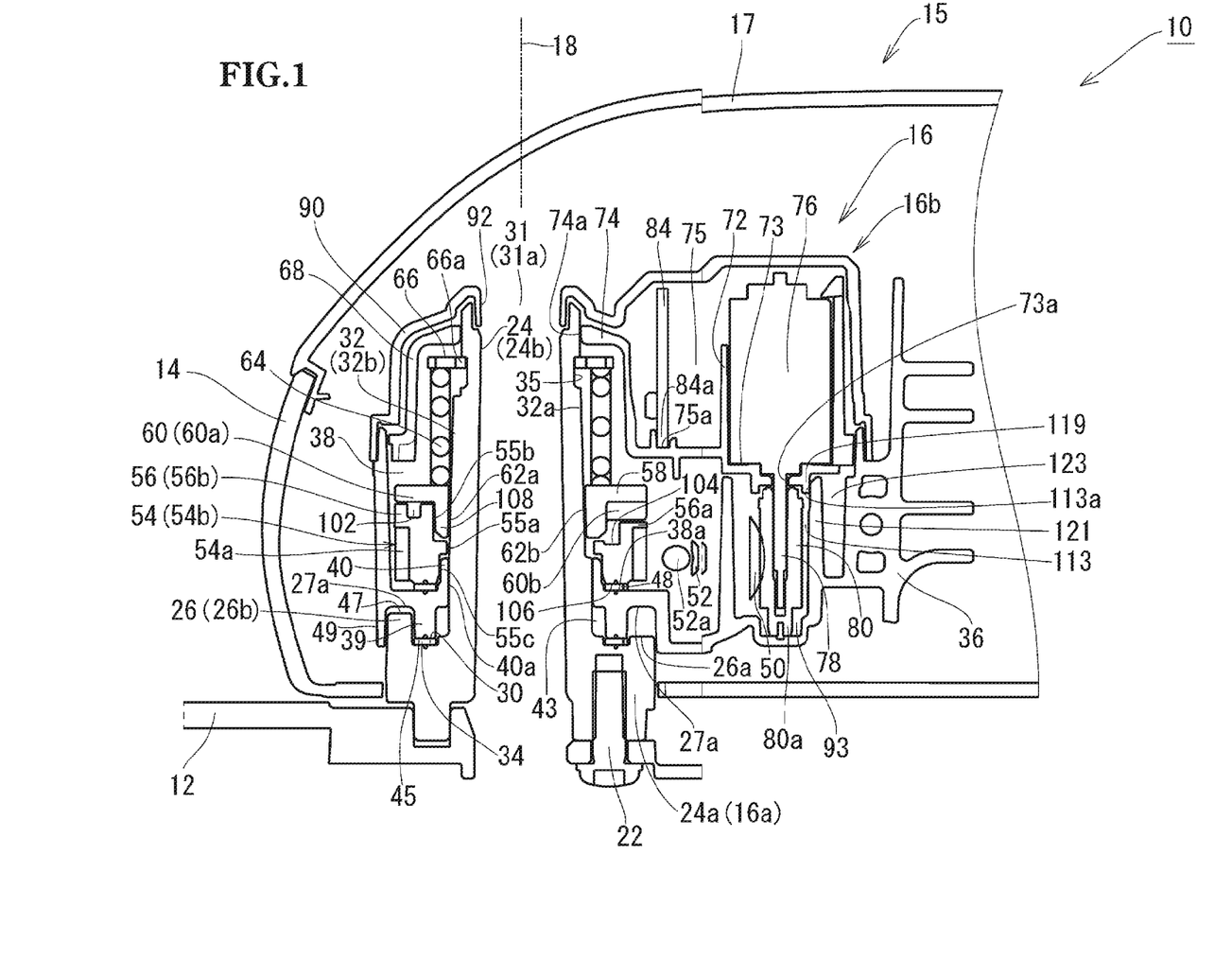
FIG. 1 is a diagram illustrating an assembled state of the door mirror in FIG. 2, and is a diagram of an end face cut at the position indicated by arrows C-C in FIG. 10.
Figure 2:
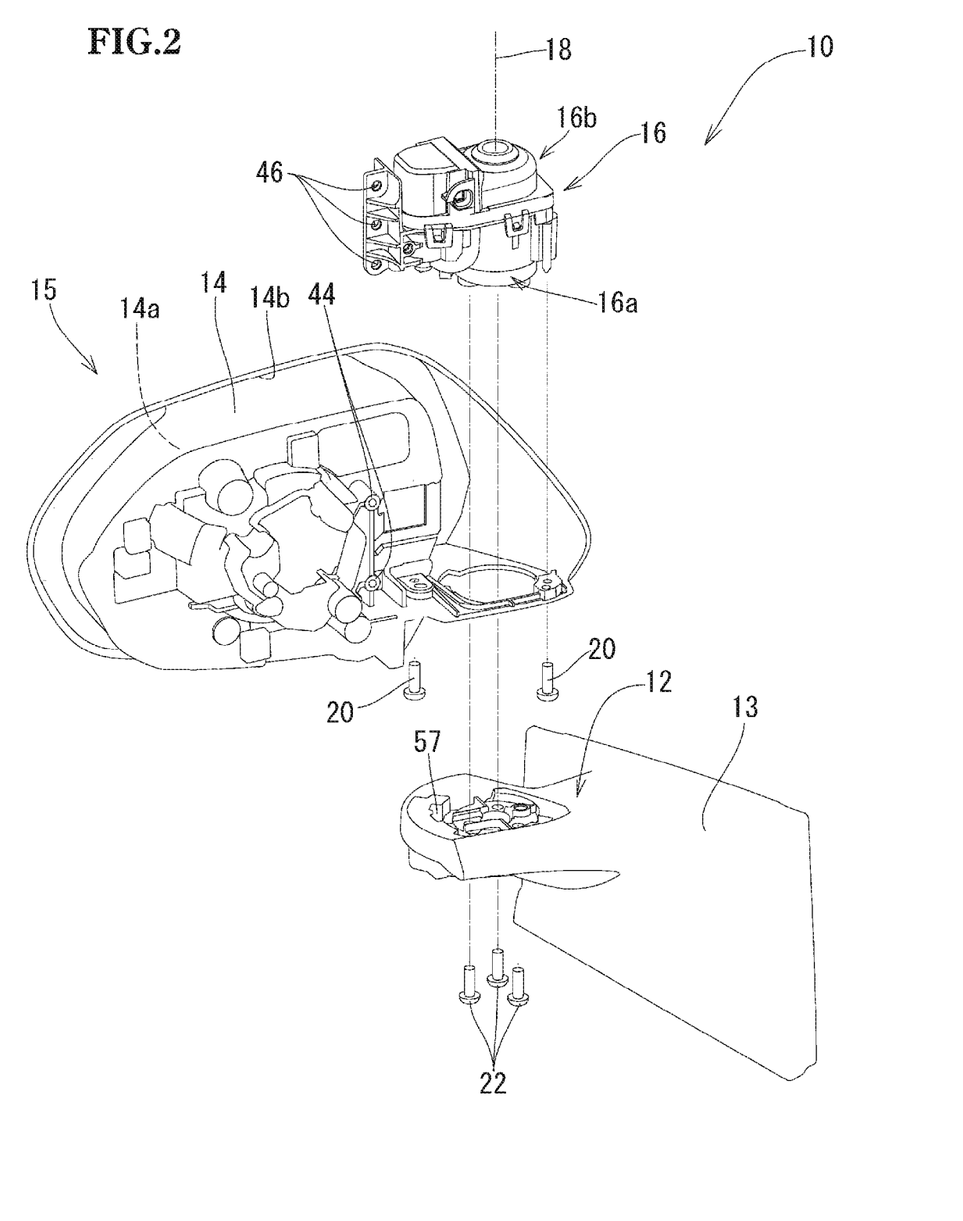
FIG. 2 is an exploded perspective view of an electric retractable door mirror for the right side of a vehicle according to an embodiment of this invention.

An embodiment of this invention will be described. FIG. 2 is an exploded perspective view of an electric retractable door mirror for the right side of a vehicle, to which this invention is applied. FIG. 2 illustrates a state of a mirror rotating section (view device rotating section) 15 in an extended position as viewed from the back side (vehicle front side). Also, in FIG. 2, illustration of, e.g., a mirror surface adjustment actuator and a mirror plate both disposed in a front opening 14a of a visor 14 and a housing cover (reference numeral 17 in FIG. 1) fitted on the back side of the visor 14 is omitted. This door mirror 10 includes a mirror base 12, a mirror rotating section 15, and an electric retracting unit 16 connected between the mirror base 12 and the mirror rotating section 15. The mirror rotating section 15 includes the visor 14. The mirror base 12 is provided so as to protrude from a vehicle body (right door) 13 to the right of the vehicle. The electric retracting unit 16 includes a fixed body 16a in a lower part and a rotating body 16b in an upper part. The rotating body 16b is rotatable relative to the fixed body 16a in a direction around a rotation axis 18. The rotating body 16b of the electric retracting unit 16 is fixed to the back side of the visor 14 by screwing two screws 20 into the rotating body 16b of the electric retracting unit 16 from a lower surface of the visor 14. In a state in which the rotating body 16b is fixed to the visor 14, the fixed body 16a of the electric retracting unit 16 is fixed to the mirror base 12 by screwing three screws 22 into the fixed body 16a of the electric retracting unit 16 from a lower surface of the mirror base 12. Consequently, the mirror rotating section 15 including the visor 14 is attached to and thereby supported on the mirror base 12 via the electric retracting unit 16 so as to be rotatable in the direction around the rotation axis 18.

The housing cover (reference numeral 17 in FIG. 1) not illustrated in FIG. 2 is fitted to a back surface of the visor 14. Consequently, an opening 14b in the back surface of the visor 14 is occluded by the housing cover 17, and as a result, the electric retracting unit 16 is housed in a space surrounded by the visor 14 and the housing cover 17. The mirror rotating section 15 rotates upon being electrically driven by the electric retracting unit 16 and is movable alternatively to a retracted position and the extended position. Also, the mirror rotating section 15 is movable from the retracted position to a forward-tilted position through the extended position and vice versa upon being rotated by an external force.

Figure 3:
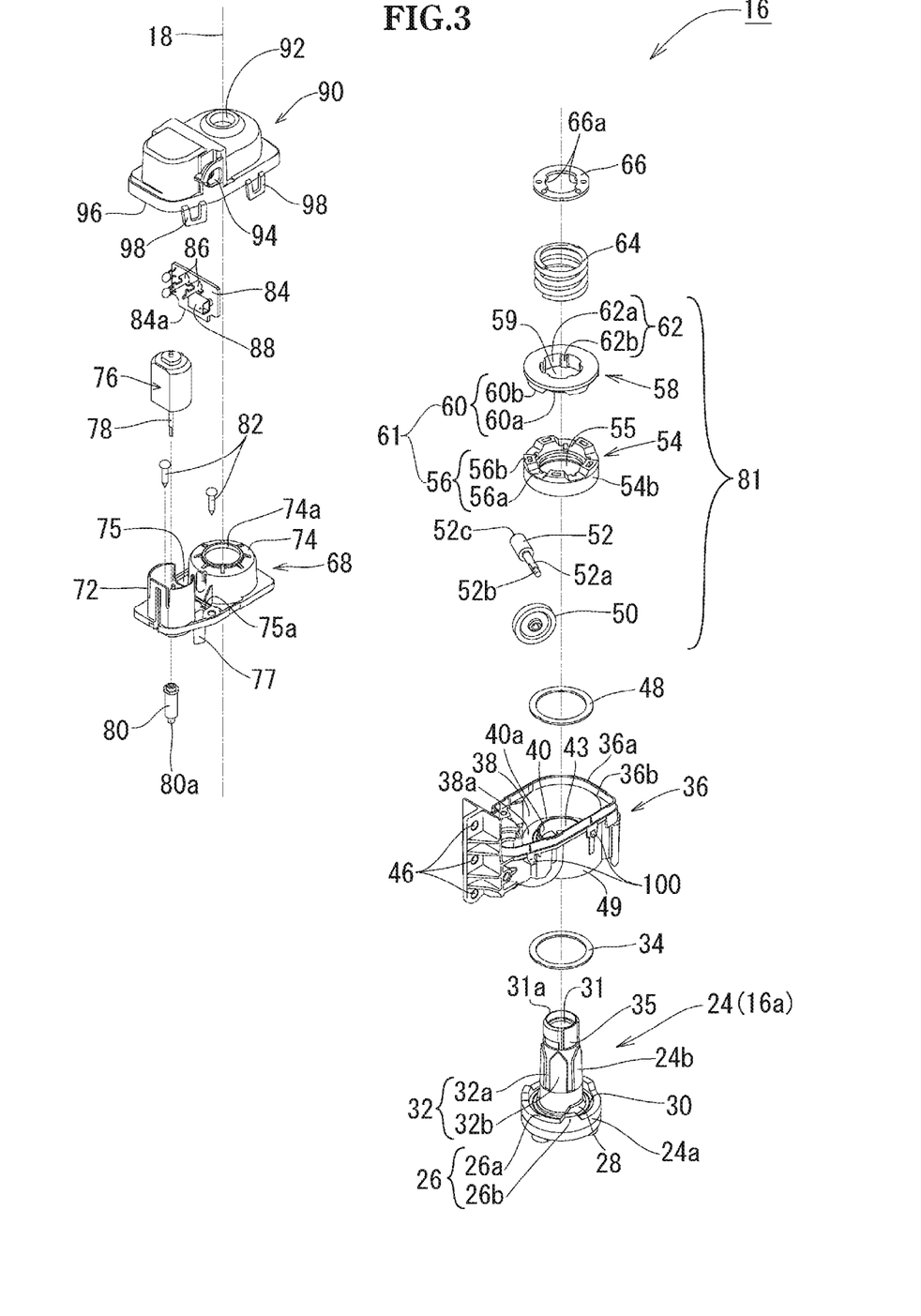
FIG. 3 is an exploded perspective view of the electric retracting unit 16 illustrated in FIG. 2.

An overall configuration of the inside of the electric retracting unit 16 will be described mainly with reference to FIG. 3. All of the components in FIG. 3 are detachably assembled into the electric retracting unit 16. The electric retracting unit 16 includes a shaft 24 forming the fixed body 16a. The shaft 24 is formed of an integrally-molded product of a reinforced resin such as PA+GF resin (glass fiber-reinforced polyamide resin). The shaft 24 coaxially includes a shaft base 24a having a large diameter and a disk-like shape in a lower part and a shaft axle 24b having a small diameter and a cylindrical shape in an upper part. The shaft 24 is provided upright so as to be orthogonal to the mirror base 12 by fixing a lower surface of the shaft base 24a to the mirror base 12 via the screws 22 (FIG. 2). A crest-valley repeated shape 26 is formed at an outermost circumferential position in an upper surface of the shaft base 24a. The crest-valley repeated shape 26 is formed of three sets of a crest 26b and a valley 26a alternately arranged in a direction around the axis of the shaft 24, the sets being each arranged with an angle of 120 degrees. A circumferential length (angle) of one valley 26a is longer than a circumferential length (angle) of one crest 26b. Also, two height maintaining protrusions 28 are formed at respective innermost circumferential positions in the upper surface of the shaft base 24a. These two height maintaining protrusions 28 are disposed so as to be spaced 180 degrees in the direction around the axis of the shaft 24 from each other and are connected to an outer circumferential surface of the shaft axle 24b. Top surfaces of the height maintaining protrusions 28 and top surfaces of height maintaining protrusions 41 of a later-described frame 36 are in abutment with and slide on each other when the mirror rotating section 15 is moved from the extended position toward the forward-tilted position by an external force. The abutment and sliding between the top surfaces causes the height maintaining protrusions 28 to maintain a height of the frame 36 relative to the shaft 24 and thereby enable the mirror rotating section 15 to be electrically returned from the forward-tilted position to the extended position. Also, a bearing surface 30 is formed at a radial position between the crest-valley repeated shape 26 at the outermost circumferential position and the height maintaining protrusions 28 at the innermost circumferential position in the upper surface of the shaft base 24a. The bearing surface 30 is formed so as to have a groove shape having a constant width, have an annular shape in the direction around the axis of the shaft 24 and be flat. A resin washer 34 is placed and received in the groove of the bearing surface 30. A hollow 31 of the shaft axle 24b is provided so as to extend through the shaft base 24a. A non-illustrated wire harness that supplies electric power to, e.g., the electric retracting unit 16 and the mirror surface adjustment actuator is inserted through the hollow 31. A rotation preventing shape 32 is formed at the outer circumferential surface of the shaft axle 24b. The rotation preventing shape 32 includes five sets of a rotation preventing recess 32a and a rotation preventing projection 32b arranged alternately circumferentially, the sets being each arranged with a same circumferential length. The respective rotation preventing recesses 32a and the respective rotation preventing projections 32b are configured so as to extend in the axis direction of the shaft 24. An upper end of each rotation preventing recess 32a opens upward in order to allow entry of a corresponding rotation preventing projection (a rotation preventing projection 62b formed on an inner circumferential surface of a later-described clutch plate 58) to be fitted in the rotation preventing recess 32a. In an outer circumferential surface of an upper part of the shaft axle 24b, grooves 35 for allowing a later-described metal plate 66 to be put onto the upper part of the shaft axle 24b and to be rotated and to be held at the upper part of the shaft axle 24b are formed.

Figure 11:
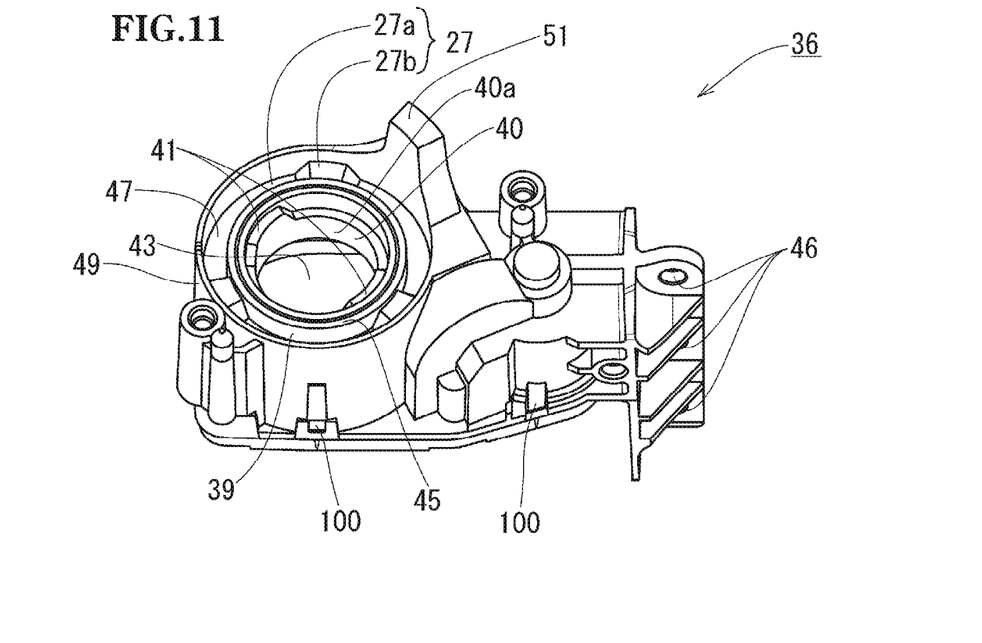
FIG. 11 is a perspective view of the frame 36 illustrated in FIG. 3 as viewed from the bottom side.

The frame 36 of the rotating body 16b is rotatably supported on the shaft 24. The frame 36 is formed of an integrally-molded product of a reinforced resin such as PA+GF resin. The frame 36 includes an inner space 38 that opens upward. At a bottom surface 38a of the inner space 38, a cylinder 40 is provided upright. A hollow 43 of the cylinder 40 extends through the bottom surface 38a. Here, the referenced drawing will temporarily be moved from FIG. 3 to FIG. 11 to describe a configuration of a lower surface of the frame 36. On the lower surface of the frame 36, a cylinder 39 is provided so as to protrude downward (upward in FIG. 11). The cylinder 39 is disposed coaxially with the cylinder 40. Also, the cylinder 39 is larger in diameter and thickness than the cylinder 40. On an inner circumferential surface of the cylinder 39, two height maintaining protrusions 41 are formed. These two height maintaining protrusions 41 are disposed so as to be spaced 180 degrees in a direction around an axis of the cylinder 39 from each other and are connected to the inner circumferential surface of the cylinder 39. The top surfaces of the two height maintaining protrusions 41 and the top surfaces of the two height maintaining protrusions 28 (FIG. 3) of the shaft base 24a are in abutment with and slide on each other. An inner circumferential surface of each height maintaining protrusion 41 is located at a same radial position as the inner circumferential surface 40a of the cylinder 40, and both inner circumferential surfaces form a continuous surface. The height maintaining protrusions 28, 41 are located at a same radial position. A lower end face of the cylinder 39 forms a bearing surface 45 that faces the bearing surface 30 of the shaft 24. On the outer side of the cylinder 39, an outer barrel 49 is disposed coaxially with the cylinder 39 with a void 47 therebetween. Inside the void 47, a crest-valley repeated shape 27 to be fitted to the crest-valley repeated shape 26 (FIG. 3) in the upper surface of the shaft base 24a is formed. The crest-valley repeated shape 27 is formed of three sets of a crest 27b and a valley 27a alternately arranged in the direction around the axis of the cylinder 39, the sets being each arranged with an angle of 120 degrees. A circumferential length (angle) of one valley 27a is longer than a circumferential length (angle) of one crest 27b. Each crest 27b is disposed so as to be connected to an outer circumferential surface of the cylinder 39, an inner circumferential surface of the outer barrel 49 and a bottom surface of the void 47. In a partial circumferential area of the outer barrel 49, a stopper 51 is formed so as to protrude downward (upward in FIG. 11). The stopper 51 is inserted to a stopper groove 57 (FIG. 2) formed in the mirror base 12 so as to be movable circumferentially, and thus sets a maximum rotation range (from the retracted position to the forward-tilted position) of the mirror rotating section 15. The shaft axle 24b is inserted to a continuous hollow 43 of the cylinders 39, 40 of the frame 36 from the cylinder 39 side. At this time, the bearing surface 45 of the frame 36 is bearing-supported by the bearing surface 30 of the shaft 24 with the resin washer 34 therebetween. Also, the inner circumferential surface 40a of the cylinder 40 on the upper side is rotatably supported by the shaft axle 24b. Consequently, the frame 36 is supported by the shaft 24 so as to be rotatable in the direction around the axis of the shaft 24. The crests 26b of the crest-valley repeated shape 26 of the shaft 24 enter the void 47 in a bottom of the frame 36. In this state, the crest-valley repeated shape 26 and the crest-valley repeated shape 27 fitted together so as to be slidable on each other in both rotation directions within a predetermined angle range. In other words, the crest-valley repeated shape 26 and the crest-valley repeated shape 27 can slide on each other in both rotation directions until an inclined surface of a boundary between each crest 26b and the corresponding valley 26a and an inclined surface of a boundary between each crest 27b and the corresponding valley 27a are brought into abutment with and thereby locked by each other (or, in the retracting direction, until the stopper 51 is locked by one end of the stopper groove 57). This sliding allows the mirror rotating section 15 (FIG. 2) to rotate between the retracted position and the extended position. Also, when an external force directed to the front side of the vehicle, the external force having a predetermined value or more, is applied to the mirror rotating section 15 in the extended position, the crests 26b and the crests 27b mutually slide up on the inclined surfaces of the respective opposite crests against a biasing force of a later-described coil spring 64 and move onto the top surfaces of the respective opposite crests, whereby the fit between the crest-valley repeated shape 26 and the crest-valley repeated shape 27 is cancelled. The cancellation of the fit allows the mirror rotating section 15 to rotate to the forward-tilted position. On one side of the frame 36, screw through holes 46 for screw-fastening and thereby fixing the frame 36 to bosses 44 (FIG. 2) provided at two, upper and lower, positions in the back surface of the visor 14 are formed. In this embodiment, the screw through holes 46 are provided at three, upper, intermediate and lower, positions. From among the screw through holes 46, screws (not illustrated) are inserted to the screw through holes 46 at the two, upper and lower, positions and screwed into the bosses 44 at the two, upper and lower, positions, whereby the frame 36 is fixed to the back surface of the visor 14.

Referring back to FIG. 3, a resin washer 48 is loosely fitted on an outer circumference of the cylinder 40 in the inner space 38 of the frame 36. The resin washer 48 is placed and supported on the bottom surface 38a of the inner space 38. The resin washer 48 is a product that is the same as the resin washer 34. An axle 52a of a metal worm 52 is inserted to a resin worm wheel 50, whereby the worm wheel 50 and the worm 52 are assembled to each other so as to be unrotatable relative to each other. The assembled worm wheel 50 and worm 52 are put in the inner space 38 of the frame 36 and disposed at a predetermined position. At this time, lower surfaces of opposite ends 52b, 52c of the axle 52a of the worm 52 are placed and supported on bearings (reference numerals 38b, 38c in FIG. 12) in the inner space 38. Consequently, the worm wheel 50 and the worm 52 can rotate integrally in the inner space 38. A shaft outside-fitting gear 54 is rotatably fitted on the outer circumference of the cylinder 40 in the inner space 38 of the frame 36. The shaft outside-fitting gear 54 is formed of an integrally-molded product of a reinforced resin such as PA+GF resin. A hollow 55 is formed in a center of a surface of the shaft outside-fitting gear 54 as viewed in an axis direction of the shaft outside-fitting gear 54. The cylinder 40 of the frame 36 and the shaft axle 24b are rotatably inserted to the hollow 55. A bearing surface 106 (FIG. 6) in a lower surface of the shaft outside-fitting gear 54 is slidably placed and supported on the resin washer 48 (FIG. 1). At an outer circumferential surface of the shaft outside-fitting gear 54, gear teeth 54b of a helical gear are formed. Consequently, the shaft outside-fitting gear 54 forms a worm wheel. The gear teeth 54b engage with the worm 52. Consequently, the shaft outside-fitting gear 54 and the worm 52 form a worm gear. A shaft outside-fitting gear-side clutch surface 56 is formed at an upper surface of the shaft outside-fitting gear 54. The shaft outside-fitting gear-side clutch surface 56 is formed of five sets of a clutch valley 56a and a clutch crest 56b arranged alternately in a direction around an axis of the shaft outside-fitting gear 54, the sets being each arranged with a same circumferential length. A circumferential length (angle) of one clutch valley 56a and a circumferential length (angle) of one clutch crest 56b are set to be equal to each other.

The clutch plate 58 is put onto the shaft axle 24b. Consequently, the clutch plate 58 is placed and supported on the shaft outside-fitting gear 54 concentrically with the shaft outside-fitting gear 54. The clutch plate 58 is formed of an integrally-molded product of a reinforced resin such as PA+GF resin. A hollow 59, to which the shaft axle 24b is inserted so as to be unrotatable and movable axially, is formed in a center of a surface of the clutch plate 58 as viewed in an axis direction of the clutch plate 58. At a lower surface of the clutch plate 58, a shaft-side clutch surface 60 is formed. The shaft-side clutch surface 60 is formed of five sets of a clutch valley 60a and a clutch crest 60b arranged alternately in a direction around the axis of the clutch plate 58, the sets being each arranged with a same circumferential length. The shaft outside-fitting gear-side clutch surface 56 and the shaft-side clutch surface 60 form a clutch mechanism 61. A circumferential length (angle) of one clutch valley 60a and a circumferential length (angle) of one clutch crest 60b of the shaft-side clutch surface 60 are set to be equal to each other. Also, the shaft outside-fitting gear-side clutch surface 56 and the shaft-side clutch surface 60 are equal to each other in inner diameter and outer diameter. Therefore, the clutch valleys 56a and the clutch crests 56b of the shaft outside-fitting gear-side clutch surface 56 are fitted to the clutch crests 60b and the clutch valleys 60a of the shaft-side clutch surface 60 with no backlash. A height changing part at a position of a boundary between each clutch valley 56a and the relevant clutch crest 56b and a height changing part at a position of a boundary between each clutch valley 60a and the relevant clutch crest 60b are formed of respective inclined surfaces, inclination angles of which are equal to each other. Consequently, the fit between the shaft outside-fitting gear-side clutch surface 56 and the shaft-side clutch surface 60 can be cancelled by means of a rotational force acting between these clutch surfaces 56, 60. A rotation preventing shape 62 is formed at an inner circumferential surface of the clutch plate 58. The rotation preventing shape 62 is formed of five sets of a rotation preventing recess 62a and the rotation preventing projection 62b that are arranged circumferentially and extend axially. The rotation preventing recesses 62a and the rotation preventing projections 62b face the rotation preventing projections 32b and the rotation preventing recesses 32a formed at the outer circumferential surface of the shaft axle 24b, respectively, via a small gap. Consequently, the rotation preventing recesses 62a and the rotation preventing projections 62b are fitted to the rotation preventing projections 32b and the rotation preventing recesses 32a so as to be unrotatable in the direction around the axis and slidable axially. As a result, the clutch plate 58 is fitted on the shaft axle 24b so as to be unrotatable in a direction around the axis of the shaft axle 24b and movable axially.

The coil spring 64 is put on the shaft axle 24b. Consequently, the coil spring 64 is placed and supported on the clutch plate 58 concentrically with the clutch plate 58. The metal plate 66 is disposed on the coil spring 64. The coil spring 64 is pressed and contracted by the metal plate 66, whereby the metal plate 66 is put onto the shaft axle 24b. Protrusions 66a formed at an inner circumferential surface of the metal plate 66 are inserted to the grooves 35 formed in the outer circumferential surface of the upper part of the shaft axle 24b and the metal plate 66 is pressed downward, and next, the metal plate 66 is rotated, whereby the metal plate 66 is fitted to the upper part of the shaft axle 24b. Consequently, the coil spring 64 is fitted in a contracted state to the shaft axle 24b. At this time, an expansion force of the coil spring 64 acts between an upper surface of the clutch plate 58 and a lower surface of the metal plate 66. This expansion force provides a fitting force between the crest-valley repeated shape 26 at the upper surface of the shaft base 24a and the crest-valley repeated shape 27 (FIG. 11) at the lower surface of the frame 36 and also between the shaft outside-fitting gear-side clutch surface 56 at the upper surface of the shaft outside-fitting gear 54 and the shaft-side clutch surface 60 at the lower surface of the clutch plate 58. However, when the mirror rotating section 15 is located between the retracted position and the extended position, the expansion force provided from the coil spring 64 to the frame 36 is received by the bearing surface 30 via the resin washer 34 through the bearing surface 45, and thus, rotation of the mirror rotating section 15 is performed by the bearing surfaces 45, 30 sliding on each other with the resin washer 34 therebetween. In other words, the rotation of the mirror rotating section 15 is bearing-supported by the abutment and sliding between the bearing surfaces 45, 30 with the resin washer 34 therebetween. Therefore, at this time, the opposed surfaces of the crest-valley repeated shapes 26, 27 are separated and are neither in abutment with nor slide on each other (see FIG. 1).

After assembly of all of the respective components illustrated on the right side of FIG. 3, an outer plate 68 is placed on a step 36b on the inner circumferential side of an opening 36a at an upper end of the frame 36 and then the opening 36a is thus closed. The outer plate 68 is formed of an integrally-molded product of a resin such as POM (polyacetal). The outer plate 68 includes a barrel 72 and a dome 74 at an upper surface thereof. The barrel 72 receives and holds a motor 76. The dome 74 surrounds an upper part of the shaft axle 24b, the upper part protruding upward from the opening 36a of the frame 36, and the coil spring 64 and the metal plate 66. A circular hole 74a that allows the upper part of the shaft axle 24b to protrude therefrom is provided in a center of a surface of the dome 74 as viewed in an axis direction of the dome. Before the outer plate 68 is put on the frame 36, the motor 76 is inserted to the barrel 72 from above and the motor 76 is thus fitted to the outer plate 68. A motor shaft (rotation axis rod) 78 of the motor 76 protrudes vertically downward below the outer plate 68 through a hole 73a formed in a center of a bottom 73 (FIG. 1) in the barrel 72. A worm 80 is fitted onto the motor shaft 78. In a state in which the outer plate 68 holds the motor 76 and the worm 80 in this way, the outer plate 68 is placed on the step 36b on the inner circumferential side of the opening 36a of the frame 36. At this time, the worm 80 and the worm wheel 50 engage with each other and form a worm gear. Also, the worm 80, the worm wheel 50, the worm 52, the shaft outside-fitting gear 54 and the clutch plate 58 form a power transmission mechanism 81 that transmits a driving force of the motor 76 to the shaft axle 24b. Also, at a lower surface of the outer plate 68, two protruding pieces 77 are formed so as to protrude downward from the lower surface. In FIG. 3, only the near-side protruding piece 77 of the two protruding pieces 77 is shown. The other protruding piece 77 is located on the side diagonally opposed to the near-side protruding piece 77. Lower end faces of the two protruding pieces 77 face upper surfaces of the opposite ends 52b, 52c of the axle 52a of the worm 52 via a small gap, respectively, whereby upward movement of the worm 52 and the worm wheel 50 is restricted. After the placement of the outer plate 68 on the step 36b on the inner circumferential side of the opening 36a of the frame 36, the outer plate 68 is fixed to the frame 36 via two screws 82.

Figure 12:
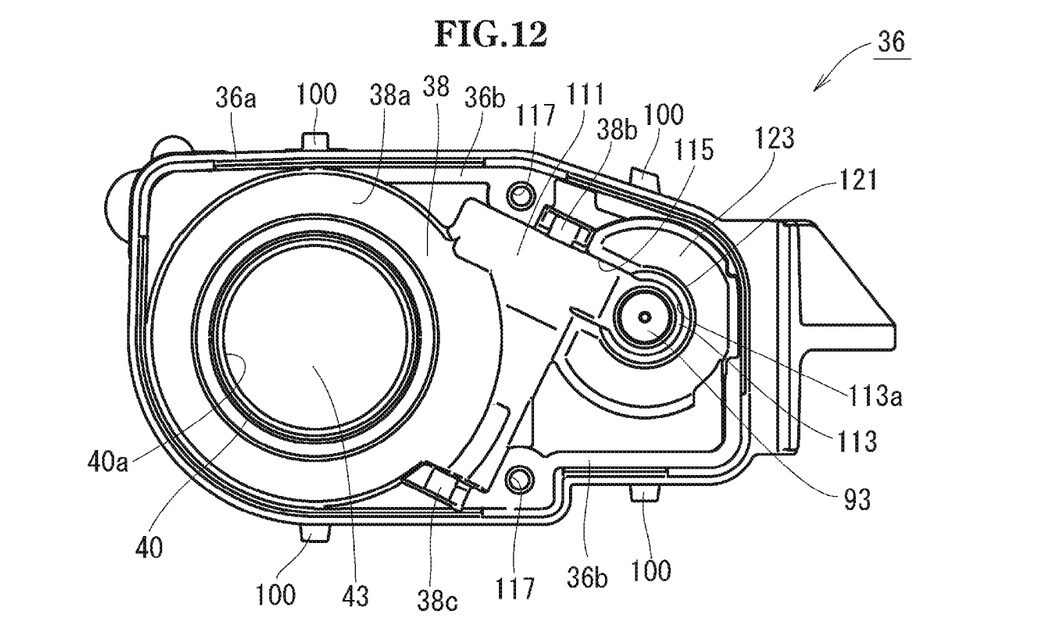
FIG. 12 is a plan view of the frame 36 illustrated in FIG. 3.

A configuration of the inside of the inner space 38 of the frame 36 will be described with reference to FIG. 12. Inside the inner space 38 of the frame 36, in addition to the components already described, e.g., a worm wheel receiving space 111, a worm receiving space 113, a worm wheel entry port 115 and two screw holes 117 are formed. The worm wheel receiving space 111 receives the worm wheel 50 coaxially fixed and fitted to the axle 52a of the worm 52. At this time, the opposite ends 52b, 52c of the axle 52a of the worm 52 are supported on the bearings 38b, 38c. The worm receiving space 113 is a space that coaxially receives the worm 80, and is formed of a space having a circular column shape having a diameter that is larger than that of the worm 80. The worm wheel entry port 115 causes the worm wheel receiving space 111 and the worm receiving space 113 to communicate with each other. Consequently, the worm wheel entry port 115 causes an outer circumferential surface of the worm wheel 50 to enter the worm receiving space 113 through the worm wheel entry port 115. As a result, the worm wheel 50 and the worm 80 engage with each other. The two screw holes 117 are screw holes for screw-in of the two screws 82 (FIG. 3) for fixing the outer plate 68 to the frame 36. A bearing recess 93 having a diameter that is smaller than a general diameter of the worm receiving space 113 is formed in a bottom of the worm receiving space 113. Grease is charged in the bearing recess 93, and a distal end 80a (FIGS. 1 and 3) of the worm 80 is received in the bearing recess 93. Consequently, the distal end 80a of the worm 80 is bearing-supported in the bearing recess 93. At the lower surface of the outer plate 68, a circular projection 119 (FIG. 1) is formed concentrically with the hole 73a (hole for letting the motor shaft 78 through, FIG. 1) in the lower surface of the outer plate 68. The projection 119 is received in a circular upper opening 113a of the worm receiving space 113. At this time, the projection 119 is received in the upper opening 113a with no gap (or with almost no gap) therearound except a part facing the worm wheel entry port 115. Consequently, an area that is no less than a half of an entire outer circumferential surface of the projection 119 is surrounded and supported by an inner circumferential surface of the upper opening 113a. As a result, the motor shaft 78 protruding from the hole 73a at a center of the projection 119 is positioned relative to the worm receiving space 113 in a surface direction perpendicular to an axis of the motor shaft 78. Around the worm receiving space 113, a cylindrical wall 121 having a constant thickness is provided, and a deep lightening hole 123 is provided outside the cylindrical wall 121. The lightening hole 123 is formed at a place excluding the part facing the worm wheel entry port 115, and consequently, the lightening hole 123 is formed in a C shape in plan view. The provision of the lightening hole 123 enables suppression of sink marks accompanying resin molding of the frame 36 and thus enables enhancement in molding accuracy of the upper opening 113a of the worm receiving space 113. Consequently, an accuracy of positioning of the motor shaft 78 relative to the worm receiving space 113 in the surface direction perpendicular to the axis of the motor shaft 78 is improved. As a result, the engagement between the worm 80 and the worm wheel 50 is maintained in a normal state, enabling operating sound generated when the worm 80 and the worm wheel 50 rotate in engagement can be maintained at a normal level.

After the fixation of the outer plate 68 to the frame 36, a circuit board (printed board) 84 is disposed upright in a space 75, between the barrel 72 and the dome 74, of the upper surface of the outer plate 68. In the circuit board 84, a motor drive circuit, motor connection terminals 86 and a connector receiving tool 88 are mounted. The motor drive circuit supplies electric drive power to the motor 76. The motor connection terminals 86 interconnect the motor drive circuit and terminals of the motor 76. A connector at a distal end of the wire harness is inserted to the connector receiving tool 88, and as a result, the connector receiving tool 88 interconnects the wire harness and the motor drive circuit. A lower end 84a of the circuit board 84 is inserted to a groove 75a of the outer plate 68, the groove 75a being formed in a bottom of the space 75 between the barrel 72 and the dome 74. Distal ends of the motor connection terminals 86 are inserted in the respective terminals of the motor 76. Consequently, the circuit board 84 is disposed upright in the space 75.

After the fixation of the outer plate 68 to the frame 36 and the attachment of the circuit board 84 to the outer plate 68, a seal cap 90 is put on the outer plate 68. The seal cap 90 is formed of an integrally-molded product of a resin such as PP (polypropylene). In an upper surface of the seal cap 90, a circular hole 92 that communicates with an upper opening 31a of the hollow 31 of the shaft axle 24b is provided. Also, in one side surface of the seal cap 90, a connector insertion port 94 that communicates with the connector receiving tool 88 of the circuit board 84 is provided. Also, at each of four positions around an opening 96 of a lower end of the seal cap 90, a claw locking frame 98 is formed. Upon the seal cap 90 being put on the outer plate 68 and the seal cap 90 being pushed down, claws 100 configured at four positions around an upper outer circumferential surface of the frame 36 so as to protrude therefrom engage with the respective claw locking frames 98 of the seal cap 90. Consequently, the frame 36 and the seal cap 90 are joined, whereby the electric retracting unit 16 is assembled in an integrated manner. The wire harness is inserted through the hollow 31 of the shaft axle 24b of the electric retracting unit 16 assembled in this way. The wire harness includes a wiring for the electric retracting unit 16. In addition, the wire harness includes, e.g., a wiring for the mirror adjustment actuator and a wiring for a turn lamp depending on the functions included in the door mirror 10. An end on the mirror rotating section 15 side of the wire harness is drawn out from the circular hole 92 of the seal cap 90. An end on the vehicle body side of the wire harness is drawn out from a lower end of the hollow 31 of the shaft 24 and guided to the inside of the vehicle body. A connector is fitted to an end on the mirror rotating section 15 side of each wiring in the wire harness. From among the connectors, a connector 89 (FIG. 10) for a distal end of the wiring for the electric retracting unit 16 is inserted to the connector insertion port 94 and thereby connected to the connector receiving tool 88 of the circuit board 84.

Figure 4:
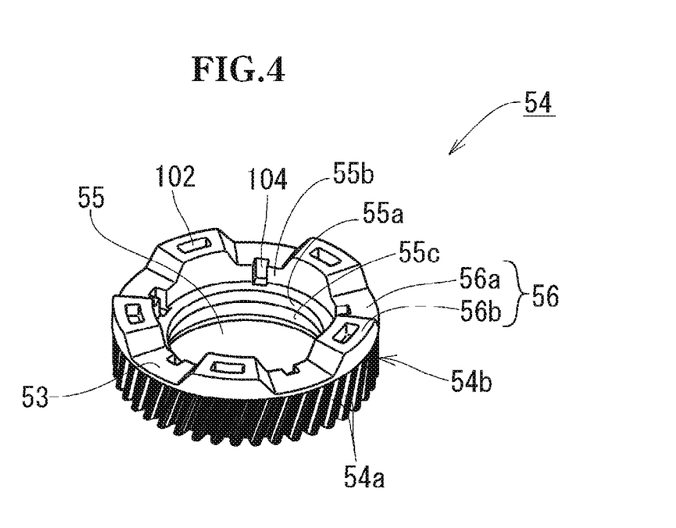
FIG. 4 is a perspective view of the shaft outside-fitting gear 54 illustrated in FIG. 3.
Figure 5:
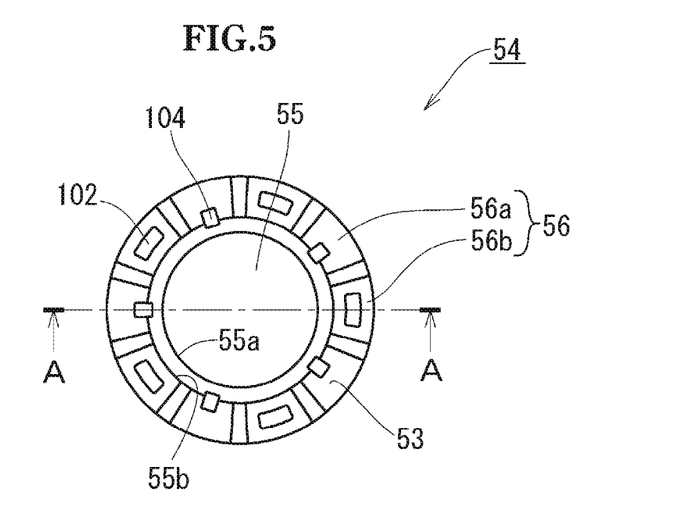
FIG. 5 is a plan view of the shaft outside-fitting gear 54 illustrated in FIG. 3.
Figure 6:
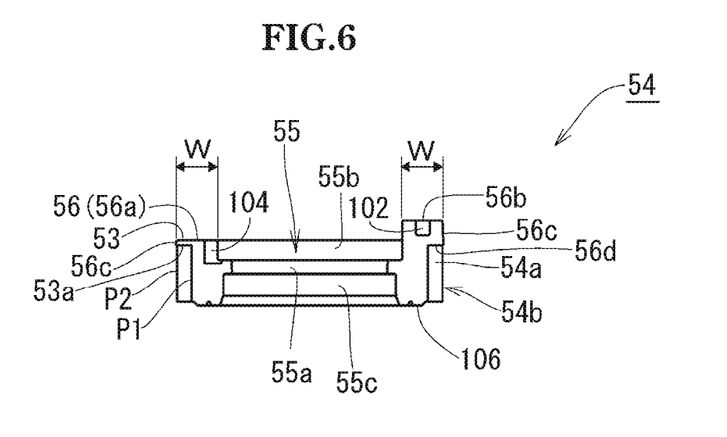
FIG. 6 is a diagram of an end face cut at the position indicated by arrows A-A in FIG. 5.

Detailed configurations of the shaft outside-fitting gear 54 and the clutch plate 58 will be described. First, the shaft outside-fitting gear 54 will be described. FIGS. 4 to 6 illustrate a detailed configuration of the shaft outside-fitting gear 54. FIG. 4 is a perspective view of the shaft outside-fitting gear 54, FIG. 5 is a plan view of the same, and FIG. 6 is a diagram of an end face cut at the position indicated by arrows A-A in FIG. 5. The hollow 55 is formed in the center of the surface of the shaft outside-fitting gear 54 as viewed in the axis direction of the shaft outside-fitting gear 54. At the outer circumferential surface of the shaft outside-fitting gear 54, gear teeth (helical teeth) 54b are formed. A module of the gear teeth 54b of the shaft outside-fitting gear 54 is set as, for example, 0.85. Consequently, the module of the gear teeth 54b of the shaft outside-fitting gear 54 is no less than 0.6, and thus, the shaft outside-fitting gear 54 can have a strength that is necessary as a shaft outside-fitting gear for an electric retracting unit while the shaft outside-fitting gear 54 is formed of a material including a resin as a base material. Also, the module of the gear teeth 54b of the shaft outside-fitting gear 54 is less than 1.0, and thus, it is possible to avoid an excessive increase in diameter of the shaft outside-fitting gear 54 and an accompanying increase in size of the mirror rotating section 15 of the door mirror 10 due to an increase in size of the electric retracting unit 16. The shaft outside-fitting gear-side clutch surface 56 is formed at the upper surface of the shaft outside-fitting gear 54. The shaft outside-fitting gear-side clutch surface 56 is formed of the clutch valleys 56a and the clutch crests 56b disposed alternately in the direction around the axis of the shaft outside-fitting gear 54. As illustrated in FIG. 6, the shaft outside-fitting gear-side clutch surface 56 is disposed extending over the inner circumferential side and the outer circumferential side of a radial position of each tooth bottom P1 of the gear tooth 54b relative to the radial position of the tooth bottom P1, in the radial direction of the shaft outside-fitting gear 54. In FIG. 6, a dimension W indicates a width, in the radial direction of the shaft outside-fitting gear 54, of the shaft outside-fitting gear-side clutch surface 56. Also, an outer circumferential end 56c of the shaft outside-fitting gear-side clutch surface 56 is disposed so as to reach a radial position of a tooth tip P2 of each gear tooth 54b (to be precise, at a position slightly on the outer circumferential side relative to the radial position of the tooth tip P2 of each gear tooth 54b). The clutch valleys 56a are disposed on a thin plate 53. Consequently, at one end, on the side on which the shaft outside-fitting gear-side clutch surface 56 is disposed, of the shaft outside-fitting gear 54, the valleys 54a of the gear teeth 54b are occluded at all of radial positions from the tooth bottom P1 to the tooth tip P2 (see FIGS. 5 and 6). In this way, the shaft outside-fitting gear-side clutch surface 56 is disposed so as to be wide in the radial direction of the shaft outside-fitting gear 54, and thus, a force received by the shaft outside-fitting gear-side clutch surface 56 can be dispersed in the radial direction of the shaft outside-fitting gear 54. Consequently, the shaft outside-fitting gear-side clutch surface 56 can have a high strength. Also, since the clutch valleys 56a are disposed on the thin plate 53, when the shaft outside-fitting gear-side clutch surface 56 and the shaft-side clutch surface 60 rotate relative to each other, the shaft-side clutch surface 60 is prevented from hitting the gear teeth 54b. Therefore, the relative rotation is prevented from being stuck and the gear teeth 54b are prevented from being chipped. Also, since the shaft outside-fitting gear-side clutch surface 56 is disposed on the structure in which the valleys 54a of the gear teeth 54b are occluded, the shaft outside-fitting gear-side clutch surface 56 can firmly be disposed on the shaft outside-fitting gear 54. Also, the gear teeth 54*b* of the shaft outside-fitting gear 54 are reinforced by the structure in which the valleys 54*a* of the gear teeth 54*b* are occluded at the one end in the axial direction of the shaft outside-fitting gear, enabling enhancement in strength of the gear teeth 54*b*. Also, since the one end face in the axis direction of the shaft outside-fitting gear 54 has the structure in which the valleys 54*a* of the gear teeth 54*b* are occluded at all of the radial positions from the tooth bottom P1 to the tooth tip P2, at the time of resin molding of the shaft outside-fitting gear 54, the shaft outside-fitting gear 54 can be resin-molded without making an end of a gear teeth-forming part of one molding die butt the other molding die. Consequently, at the time of resin molding, breakage of the end of the gear-teeth forming part of the one molding die is prevented. Also, a lower surface 56*d* of each clutch crest 56*b* is disposed so as to be in plane with a lower surface 53*a* of the thin plate 53. As a result, the gear teeth 54*b* have a uniform width in the axis direction of the shaft outside-fitting gear 54 in the entire circumference.

In a top of each clutch crest 56*b*, a lightening hole 102 is formed. Also, in a bottom of each clutch valley 56*a*, a lightening hole 104 is formed at a position on the inner circumferential side relative to a dedendum circle of the gear teeth 54*b* (that is, a position at which the lightening hole 104 does not interfere with the gear teeth 54*b*). Consequently, generation of sink marks in the shaft outside-fitting gear 54 accompanying resin molding can be suppressed, and also weight of the shaft outside-fitting gear 54 can be reduced. Also, draft angles of parts of a molding die for resin molding of the shaft outside-fitting gear 54, the parts allowing formation of the lightening holes 102, 104, are set as around zero degrees, enabling such parts of the molding die to function as a "sticking" preventing structure when the shaft outside-fitting gear 54 is released from the opposite molding die.

At an inner circumferential surface of the hollow 55 of the shaft outside-fitting gear 54, a circular small-diameter part 55*a* is formed at an intermediate position in a top-bottom direction of the inner circumferential surface. The small-diameter part 55*a* faces the shaft axle 24*b* with a small gap therebetween. At the inner circumferential surface of the hollow 55, a cylindrical barrel bearing 55*b* having a diameter that is larger than that of the small-diameter part 55*a* is formed on the upper side of the small-diameter part 55*a*. A later-described barrel 108 of the clutch plate 58 is received on the barrel bearing 55*b*. The clutch valleys 56*a* and the clutch crests 56*b* are formed so as to reach an inner circumferential surface of the barrel bearing 55*b* on the inner circumferential side. At the inner circumferential surface of the hollow 55, a cylinder receiving portion 55*c* is formed on the lower side of the small-diameter part 55*a*. The cylinder 40 of the frame 36 is rotatably received on the cylinder receiving portion 55*c*. At a radial position between an inner circumferential surface of the cylinder receiving portion 55*c* and the dedendum circle of the gear teeth 54*b* in the lower surface of the shaft outside-fitting gear 54, the bearing surface 106 is formed continuously through the entire circumference in the direction around the axis of the shaft outside-fitting gear 54. The bearing surface 106 is formed so as to protrude slightly below the gear teeth 54*b*. The bearing surface 106 is slidably placed and supported on the resin washer 48 (FIG. 3). Consequently, the shaft outside-fitting gear 54 is slidably supported on the resin washer 48 inside the inner space 38 of the frame 36 and is supported by the cylinder 40 so as to be rotatable in the direction around the axis.

The lower surface of the shaft outside-fitting gear 54 has a structure in which the valleys 54*a* of the gear teeth 54*b* fully open to the lower surface. Therefore, the worm 52 and the gear teeth 54*b* can be made to engage with each other by fitting the shaft outside-fitting gear 54 onto the shaft axle 24*b* after putting the worm 52 in the inner space 38 of the frame 36 (FIG. 3).

Figure 7:
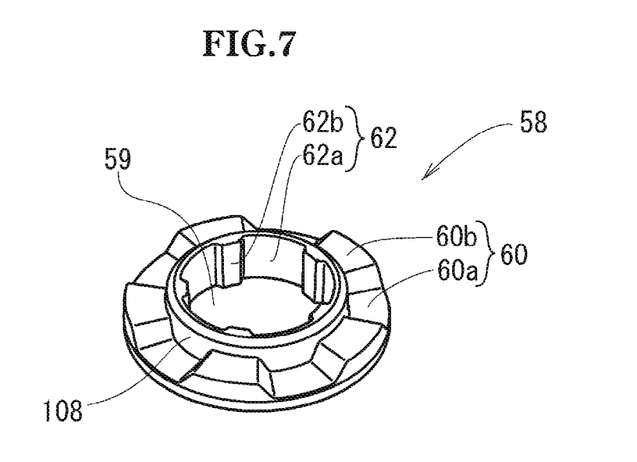
FIG. 7 is a perspective diagram of the clutch plate 58 illustrated in FIG. 3 as viewed from the bottom side.
Figure 8:
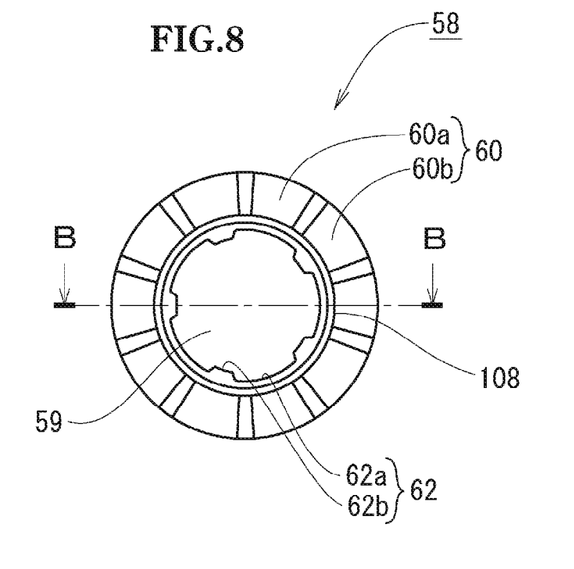
FIG. 8 is a bottom view of the clutch plate 58 illustrated in FIG. 3.
Figure 9:
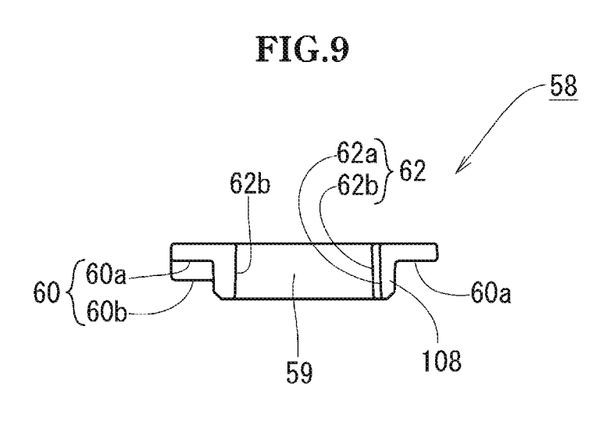
FIG. 9 is a diagram of an end face cut at the position indicated by arrows B-B in FIG. 8.

Next, the clutch plate 58 will be described. FIGS. 7 to 9 illustrate a detailed configuration of the clutch plate 58. FIG. 7 is a perspective view of the clutch plate 58 as viewed from the bottom side, FIG. 8 is a bottom view of the same, and FIG. 9 is a diagram of an end face cut at the position indicated by arrow B-B in FIG. 8. The hollow 59 is formed in the center of the surface of the clutch plate 58 as viewed in the axis direction of the clutch plate 58. An outer diameter of the clutch plate 58 is set to be equal to an outer diameter of the shaft outside-fitting gear 54. At the lower surface (surface on the side shown in FIG. 7) of the clutch plate 58, the shaft-side clutch surface 60 is formed. The shaft-side clutch surface 60 is formed of the clutch valleys 60*a* and the clutch crests 60*b* arranged alternately in the direction around the axis of the clutch plate 58. The clutch valleys 60*a* and the clutch crests 60*b* are formed so as to reach an outermost position in the clutch plate 58 on an outer circumferential side.

In a center of the lower surface of the clutch plate 58, a cylindrical barrel 108 is formed so as to reach a position beyond tops of the clutch crests 60*b*. The clutch valleys 60*a* and the clutch crests 60*b* are formed so as to reach an outer circumferential surface of the barrel 108 on the inner circumferential side, and inner circumferential ends of the clutch valleys 60*a* and the clutch crests 60*b* are connected to the outer circumferential surface of the barrel 108. The barrel 108 is rotatably received in the barrel bearing 55*b* of the shaft outside-fitting gear 54. The hollow 59 formed in the center of the surface of the clutch plate 58 as viewed in the axis direction of the clutch plate 58 is formed continuously from the upper surface of the clutch plate 58 to a distal end of the barrel 108. The rotation preventing recesses 62*a* and the rotation preventing projections 62*b* of the rotation preventing shape 62 are formed at an inner circumferential surface of the hollow 59 over an entire length in an axis direction of the hollow 59 (entire length in a thickness direction of the clutch plate 58). The rotation preventing projections 62*b* are disposed at respective positions at which the rotation preventing projections 62*b* circumferentially overlap the clutch crests 60*b*.

Figure 10:
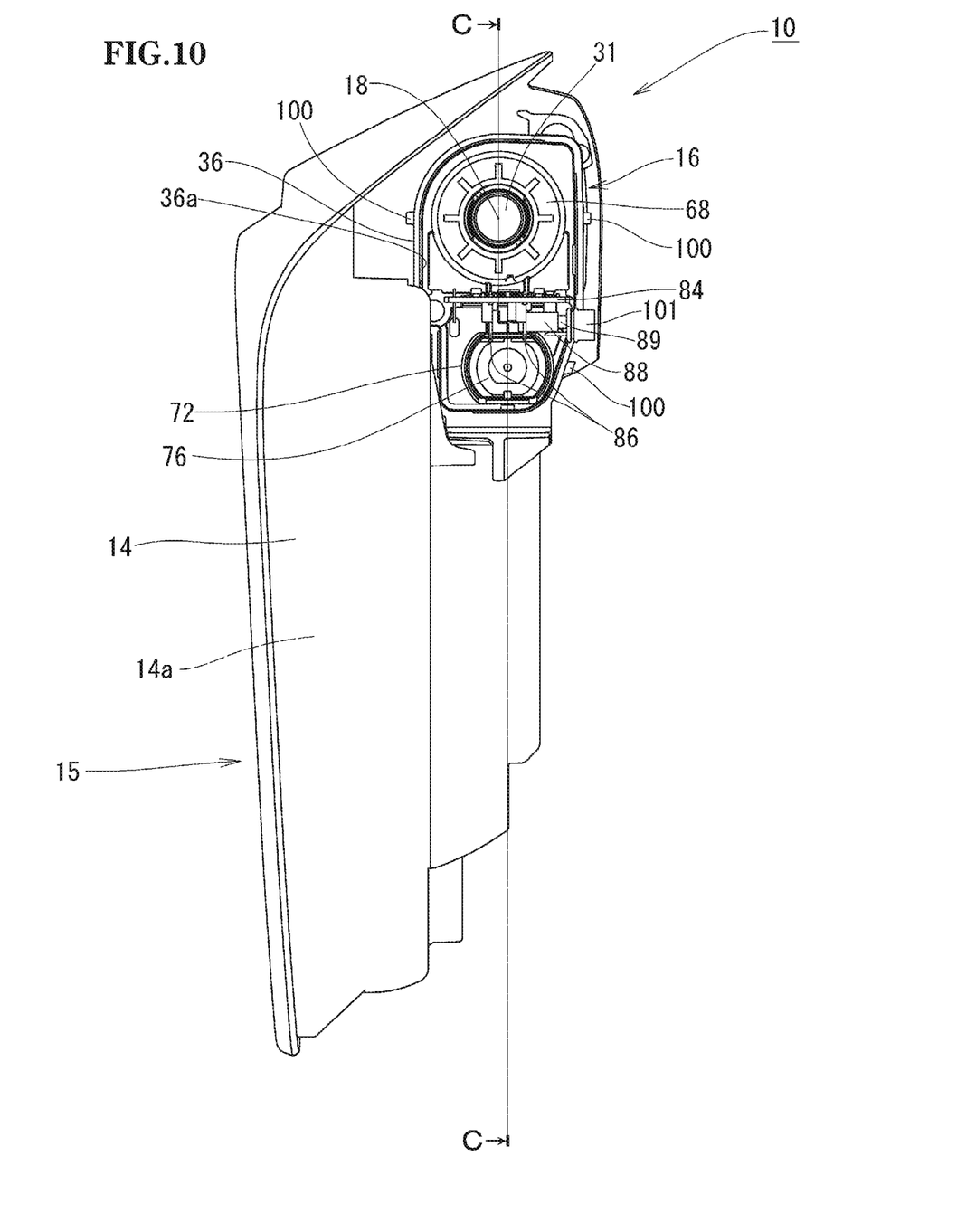
FIG. 10 is a plan view illustrating an assembled state of the door mirror in FIG. 2.

FIG. 10 illustrates a plan view of an assembled state of the door mirror 10 in FIG. 2 having the configuration described above. In FIG. 10, illustration of the housing cover 17 and the mirror base 12 is omitted. Also, the electric retracting unit 16 is illustrated with the seal cap 90 removed and the connector 89 at the distal end of the wire harness inserted to the connector receiving tool 88, rubber packing 101 being attached to the connector 89. Also, FIG. 1 illustrates an end face cut at the position indicated by arrow C-C in FIG. 10. FIG. 1 illustrates a state in which the housing cover 17 is fitted to the visor 14, the mirror rotating section 15 is in the extended position and the shaft outside-fitting gear-side clutch surface 56 and the shaft-side clutch surface 60 engage with each other. At this time, although it is not shown in FIG. 1, the inclined surfaces of the boundaries between the crests 26*b* and the valleys 26*a* and the relevant inclined surfaces of the boundaries between the crests 27*b* and the valleys 27*a* are in abutment with each other and whereby the crest-valley repeated shape 26 and the crest-valley repeated shape 27 are locked by each other. Rotational operation of the mirror rotating section 15 will be described based on FIG. 1.

<<Normal Electric Retracting/Extending Operation>>

In the state in FIG. 1, upon an instruction for retracting being provided by operating a mirror switch, the motor 76 is started. Consequently, the bearing surface 30 and the bearing surface 45 slide on each other with the resin washer 34 therebetween, and the bottom surface 38*a* of the inner space 38 of the frame 36 and the bearing surface 106 of the lower surface of the shaft outside-fitting gear 54 slide on each other with the resin washer 48 therebetween, whereby the mirror rotating section 15 rotates in a retracting direction. Upon the rotation of the mirror rotating section 15 being physically stopped in the retracted position by engagement between the stopper 51 (FIG. 11) and the one end of stopper groove 57 (FIG. 2), the stoppage is detected and the driving of the motor 76 is stopped. Consequently, the mirror rotating section 15 is held in the retracted position. In this state, upon an instruction for extending being provided by operating the mirror switch, the motor 76 is started in a reverse direction, whereby the mirror rotating section 15 rotates in an extending direction. Upon the rotation of the mirror rotating section 15 being stopped in the extended position by engagement between the inclined surfaces of the boundaries between the crests 26*b* and the valleys 26*a* of the crest-valley repeated shape 26 and the inclined surfaces of the boundaries between the crests 27*b* and the valleys 27*a* of the crest-valley repeated shape 27, the stoppage is detected and the driving of the motor 76 is stopped. Consequently, the mirror rotating section 15 is held in the extended position.

<<Manual Retracting/Extending Operation>>

In the state in FIG. 1, upon a force being manually applied in the retracting direction to the mirror rotating section 15, the gear teeth 54*b* engages with the worm 52 that is not rotated, and thus the shaft outside-fitting gear 54 is unrotatable relative to the frame 36, and thus, the shaft outside-fitting gear-side clutch surface 56 and the shaft-side clutch surface 60 are disengaged from each other against the biasing force of the coil spring 64. Consequently, the mirror rotating section 15 is rotated in the retracting direction. The rotation of the mirror rotating section 15 is physically stopped in the retracted position by engagement between the stopper 51 and the one end of the stopper groove 57. In this state, upon a force in the extending direction being manually applied to the mirror rotating section 15, the shaft outside-fitting gear-side clutch surface 56 and the shaft-side clutch surface 60 are disengaged from each other against the biasing force of the coil spring 64 as in the above, and thus, the mirror rotating section 15 is rotated in the extending direction. The rotation of the mirror rotating section 15 is stopped in the extended position by engagement between the inclined surfaces of the boundaries between the crests 26*b* and the valleys 26*a* of the crest-valley repeated shape 26 and the inclined surfaces of the boundaries between the crests 27*b* and the valleys 27*a* of the crest-valley repeated shape 27. At this time, the shaft outside-fitting gear-side clutch surface 56 and the shaft-side clutch surface 60 are brought back into engagement with each other.

<<Forward Tilting Operation by External Force>>

In the state in FIG. 1, upon an external force having a predetermined value or more, the external force being directed to the front side of the vehicle, being provided to the mirror rotating section 15, the crests 26*b* and the crests 27*b* of the crest-valley repeated shape 26 and the crest-valley repeated shape 27 move up on the relevant inclined surfaces against the biasing force of the coil spring 64, whereby the fit between the crest-valley repeated shape 26 and the crest-valley repeated shape 27 is cancelled. Consequently, the frame 36 is brought up relative to the shaft 24, and the shaft outside-fitting gear-side clutch surface 56 and the shaft-side clutch surface 60 are disengaged from each other against the biasing force of the coil spring 64, and the mirror rotating section 15 is thus rotated in a forward tilting direction. This rotation is initially performed by abutment and sliding between top surfaces of the crests 26*b* and the crests 27*b*. As the rotation advances, the abutment between the top surfaces of the crests 26*b* and the crests 27*b* is cancelled, and the crests 26*b* and the crest 27*b* try to move down on the respective opposite inclined surfaces mutually. However, before the crests 26*b* and the crests 27*b* run on the respective opposite inclined surfaces, the top surfaces of the height maintaining protrusions 28 and the height maintaining protrusion 41 are brought into abutment with and slide on each other. As a result, the height of the frame 36 relative to the shaft 24 is maintained. The mirror rotating section 15 is physically stopped in the forward-tilted position by engagement between the stopper 51 and another end of the stopper groove 57, with the height of the frame 36 still maintained.

<<Electric Operation of Returning from Forward-Tilted Position>>

In a state in which the mirror rotating section 15 is located in the forward-tilted position, upon an instruction for retracting being provided by operating the mirror switch, the motor 76 is started. At this time, the shaft outside-fitting gear-side clutch surface 56 and the shaft-side clutch surface 60 engage with each other again. Also, at this time, the height of the frame 36 relative to the shaft 24 is maintained by abutment between the top surfaces of the height maintaining protrusions 28, 41 (that is, the crests 26*b* and the crests 27*b* of the crest-valley repeated shape 26 and the crest-valley repeated shape 27 do not need to move up on the respective opposite inclined surfaces mutually), and thus, the mirror rotating section 15 rotates in the retracting direction. During the rotation, the abutment between the top surfaces of the height maintaining protrusions 28, 41 is cancelled and is taken over by abutment between the top surfaces of the crests 26*b* and the crests 27*b*. Upon the mirror rotating section 15 further rotating, the crests 26*b* and the crests 27*b* move down on the respective opposite inclined surfaces mutually, and the mirror rotating section 15 moves to the retracted position through the extended position and stops. Upon an instruction for extending being provided again by operating the mirror switch, the mirror rotating section 15 rotates to the extended position and stops by means of normal electric extending operation.

<<Manual Operation of Returning from Forward-Tilted Position>>

In a state in which the mirror rotating section 15 is located in the forward-tilted position, upon a force being manually applied to the mirror rotating section 15, the mirror rotating section 15 is rotated in the retracting direction with the shaft outside-fitting gear-side clutch surface 56 and the shaft-side clutch surface 60 disengaged. As the rotation advances, the crests 26*b* and the crests 27*b* move down on the respective opposite inclined surfaces mutually, and in the extended position, the shaft outside-fitting gear-side clutch surface 56 and the shaft-side clutch surface 60 engage with each other, and the rotation of the mirror rotating section 15 can thus be stopped. Upon a force being further applied to the mirror rotating section 15 in the retracting direction, the shaft outside-fitting gear-side clutch surface 56 and the shaft-side clutch surface 60 are disengaged from each other, and thus the mirror rotating section 15 is rotated in the retracting direction. The rotation of the mirror rotating section 15 is physically stopped in the retracted position by engagement between the stopper 51 and the one end of the stopper groove 57.

Although the above embodiment has been described in terms of the case where this invention is applied to an electric retractable rear view mirror for a vehicle, this invention is not limited to this case. In other words, this invention is applicable to any of an electric retractable rear view camera for a vehicle, the rear view camera being mounted on a door of a vehicle so as to protrude to the lateral side of the vehicle, other electric retractable rear-view devices for a vehicle and electric retractable view devices for a vehicle for purposes other than a rear view purpose, instead of applying this invention to a door mirror. An electric retractable rear view camera for a vehicle can be formed as, for example, one obtained by forming the visor 14 in FIG. 2 so as to have a small size and, instead of the mirror plate, mounting a camera in the visor 14 in such a manner that an optical axis of the camera faces the rear side of the vehicle when the visor 14 is in a use position.

The invention claimed is:

1. An electric retractable view device for a vehicle, the view device comprising:
   a view device base on which a shaft stands;
   a view device rotating section supported by the view device base so as to be rotatable in a direction around an axis of the shaft;
   a motor that electrically drives the view device rotating section to reversibly rotate in the direction around the axis of the shaft and thereby move the view device rotating section to a retracted position and an extended position;
   a spring that biases the view device rotating section in a direction toward the view device base along the axis of the shaft; and
   crest-valley repeated shapes disposed so as to be opposed to each other in opposed surfaces that are opposed to each other and rotate relative to each other in the direction around the axis of the shaft between a view device base side at which the shaft stands on the view device base and a view device rotating section side at which the view device rotating section is rotatably supported by the view device base, each of the crest-valley repeated shapes being arranged in the relevant opposed surface in the direction around the axis of the shaft, the crest-valley repeated shapes being fitted to each other by a biasing force of the spring while allowing the view device rotating section to rotate between the retracted position and the extended position upon the view device rotating section being driven by the motor,
   the view device rotating section moved from the retracted position toward the extended position as a result of being driven by the motor being mechanically locked in the extended position by abutment between the crest-valley repeated shapes,
   upon an external force having a predetermined value or more being applied to the view device rotating section in a direction toward a vehicle front side in a state in which the view device rotating section is located in the extended position, the fit between the crest-valley repeated shapes being cancelled against the biasing force of the spring, and top surfaces of respective crests of the crest-valley repeated shapes moving onto each other and being brought into abutment with and sliding on each other, and the view device rotating section thereby rotating toward a forward-tilted position, wherein
   the electric retractable view device includes respective height maintaining protrusions disposed so as to be opposed to each other in the opposed surfaces,
   the height maintaining protrusions are disposed in such a manner that when the view device rotating section is rotated from the extended position toward the forward-tilted position, respective top surfaces of the height maintaining protrusions are brought into abutment with and slide on each other in a position in which the abutment between the top surfaces of the respective crests of the crest-valley repeated shapes is cancelled, to maintain a height of the view device rotating section relative to the shaft,
   the respective top surfaces of the height maintaining protrusions are configured to slide over each other in a rotational direction around the axis of the shaft, and
   at least one of the height maintaining protrusions and at least one of the crest-valley repeated shapes are both provided on a base of the shaft.

2. The electric retractable view device for a vehicle according to claim 1, wherein
   the crest-valley repeated shapes and the height maintaining protrusions are disposed at respective radial positions that are different from each other relative to a rotation axis of the view device rotating section.

3. The electric retractable view device for a vehicle according to claim 2, wherein
   the at least one of the height maintaining protrusions provided on the base of the shaft comprises a pair of height maintaining protrusions disposed at 180 degree intervals from each other in a circumferential direction with the rotation axis of the view device rotating section as a center.

4. The electric retractable view device for a vehicle according to claim 3, wherein
   the crest-valley repeated shape includes three sets of a crest and a valley on the view device base side and the view device rotating section side, respectively, the sets being each arranged at 120 degree intervals in the circumferential direction with a rotation axis of the view device rotating section as a center.

5. The electric retractable view device for a vehicle according to claim 2, wherein
   the crest-valley repeated shape includes three sets of a crest and a valley on the view device base side and the view device rotating section side, respectively, the sets being each arranged at 120 degree intervals in the circumferential direction with a rotation axis of the view device rotating section as a center.

6. The electric retractable view device for a vehicle according to claim 2, wherein
   another of the height maintaining protrusions are provided on a frame of the view device rotating section, the frame being rotatably supported on the shaft.

7. The electric retractable view device for a vehicle according to claim 6, wherein
   the another of the height maintaining protrusions provided on the frame comprises a pair of height maintaining protrusions disposed at 180 degree intervals from each other in a circumferential direction with a rotation axis of the view device rotating section as a center.

8. The electric retractable view device for a vehicle according to claim 1, wherein the at least one of the height maintaining protrusions provided on the base of the shaft comprises a pair of height maintaining protrusions disposed at 180 degree intervals from each other in a circumferential direction with a rotation axis of the view device rotating section as a center, respectively.

9. The electric retractable view device for a vehicle according to claim 8, wherein the crest-valley repeated shape includes three sets of a crest and a valley on the view device base side and the view device rotating section side, respectively, the sets being each arranged at 120 degree intervals in the circumferential direction with a rotation axis of the view device rotating section as a center.

10. The electric retractable view device for a vehicle according to claim 1, wherein the crest-valley repeated shape includes three sets of a crest and a valley on the view device base side and the view device rotating section side, respectively, the sets being each arranged at 120 degree intervals in the circumferential direction with a rotation axis of the view device rotating section as a center.

11. The electric retractable view device for a vehicle according to claim 1, wherein on the view device base side, the crest-valley repeated shape and the height maintaining protrusion are integrally configured in a single component including a resin.

12. The electric retractable view device for a vehicle according to claim 1, wherein on the view device rotating section side, the crest-valley repeated shape and the height maintaining protrusion are integrally configured in a single component including a resin.

13. The electric retractable view device for a vehicle according to claim 1, wherein the crest-valley repeated shapes are provided radially outward of the height maintaining protrusions.

14. The electric retractable view device for a vehicle according to claim 1, wherein another of the height maintaining protrusions are provided on a frame of the view device rotating section, the frame being rotatably supported on the shaft.

15. The electric retractable view device for a vehicle according to claim 14, wherein the another of the height maintaining protrusions provided on the frame comprises a pair of height maintaining protrusions disposed at 180 degree intervals from each other in a circumferential direction with a rotation axis of the view device rotating section as a center.

* * * * *

UNITED STATES PATENT AND TRADEMARK OFFICE
CERTIFICATE OF CORRECTION

PATENT NO. : 10,807,534 B2
APPLICATION NO. : 16/210557
DATED : October 20, 2020
INVENTOR(S) : M. Motomiya et al.

Page 1 of 1

It is certified that error appears in the above-identified patent and that said Letters Patent is hereby corrected as shown below:

In the Claims

At Column 17, Line 6 (Claim 8), please change "center, respectively." to -- center. --.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*